Oct. 19, 1937.  L. FORTIER  2,096,096
VEHICLE SIGNAL
Filed May 21, 1936
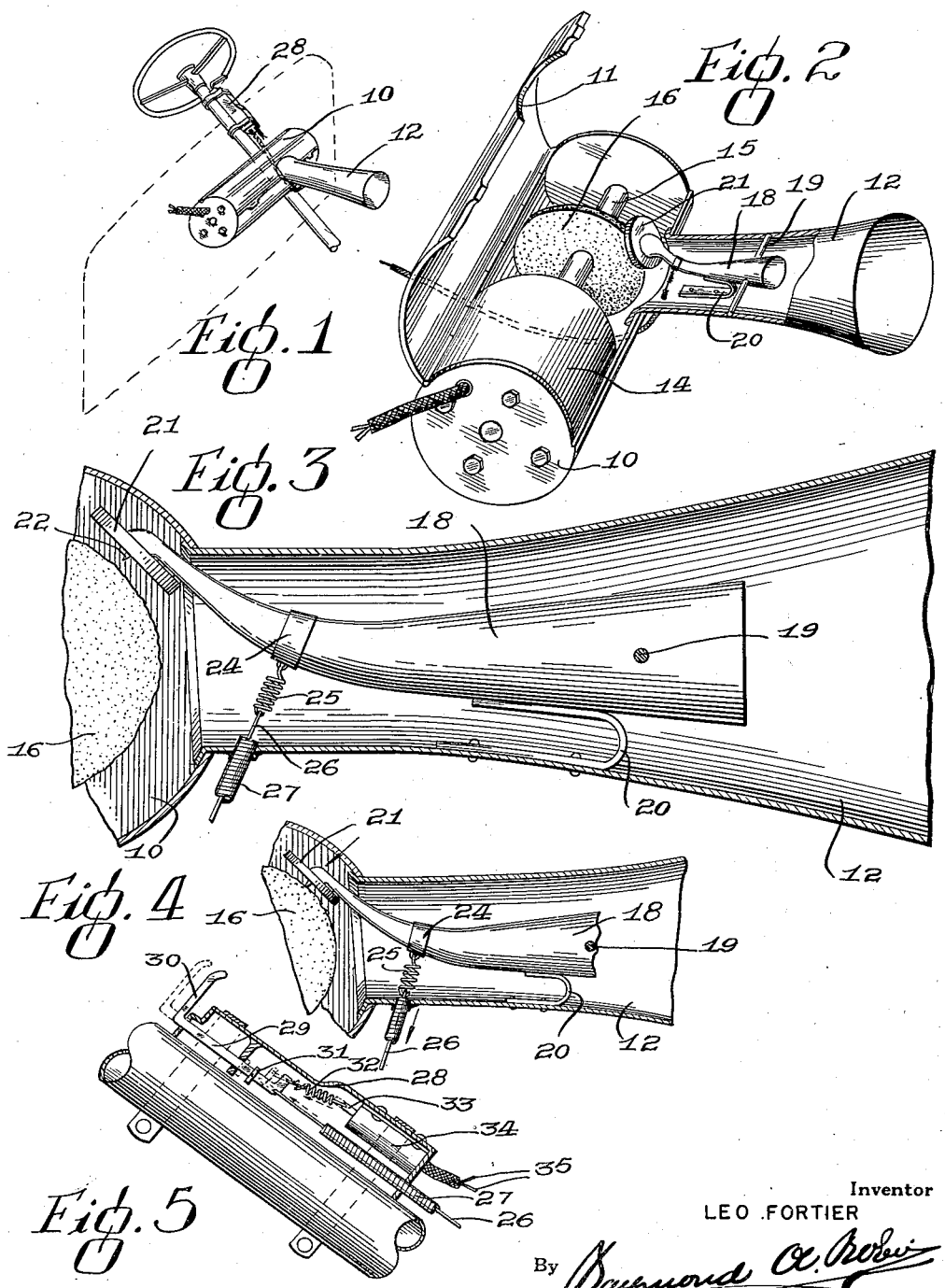
Inventor
LEO FORTIER Patented Oct. 19, 1937

2,096,096

UNITED STATES PATENT OFFICE 2,096,096

VEHICLE SIGNAL

Leo Fortier, St. Ferreol, Quebec, Canada

Application May 21, 1936, Serial No. 81,059

1 Claim. (Cl. 274—1)

The present invention relates to improvements in vehicle signals.

An object of the invention is the provision of a vehicle signal constructed so as to reproduce selected sounds.

Another object of the invention is the provision of a vehicle signal which is capable of reproducing predetermined sounds such as speech or music.

A further object of the invention is the provision of a vehicle signal of the aforesaid character which may be conveniently controlled by the vehicle operator.

Still another object of the invention is the provision of a vehicle signal of the above character which is simple in construction and efficient in operation.

Other objects and advantages of the invention will become apparent as the description progresses.

In the accompanying drawing forming a part of this specification and in which like reference characters are employed to designate corresponding parts throughout the same:

Figure 1 is a perspective view showing the signal operatively mounted on the steering post of an automobile, Figure 2 is a perspective view of the signal with the casing open and part thereof broken away to show interior construction, Figure 3 is an enlarged longitudinal section through the signal, Figure 4 is a similar section reduced and showing the signal device in sounding arrangement, and Figure 5 is a longitudinal section through the control mechanism mounted on the vehicle steering post.

Referring to the drawing, wherein for the purpose of illustration is shown a preferred embodiment of the invention, 10 generally designates a hollow cylindrical casing having a hinged cover 11. To the front wall structure of the casing, in registration with an opening therein, is connected a tubular horn 12 having an increasing taper toward the outer end.

Within the casing 10 is fitted an electric operating motor 14 provided with a shaft 15 extending longitudinally in the casing and formed so that a record 16 may be removably fastened thereon. The record 16 is in the form of a disc secured concentrically on the shaft 15 having sound grooves and indentations upon the periphery thereof.

Within the horn 12 is mounted a concentrically disposed tone-arm 18 connected with a pivot pin 19 arranged transversely in the horn. A U-shaped spring 20 is disposed so that one arm is fastened to the interior of the horn 12, while the opposed arm bears against or is fastened to the under-side of the tone-arm 18, inwardly of the pivot pin so that the spring tends to raise the inner end of the tone-arm. At the inner extremity, the tone-arm 18 is provided with suitable reproducing mechanism such as a diaphragm enclosing sound-box 21 equipped with a stylus 22 movable into contact with the sound grooves on the periphery of the record disc 16.

On the intermediate portion of the tone-arm is fitted a ring 24 formed with an eye to which is connected one end of a coiled tension spring 25. The opposed end of the tension spring 25 is connected with a flexible operating member 26, which may be a suitable wire. The wire 26, which is preferably enclosed in a suitable conduit 27, is extended through an opening in the rear end of a housing 28 adapted to be secured on the steering post of an automobile adjacent the steering wheel. The inner end of the wire is fastened to the inner extremity of a slide bracket 29 having a longitudinal body portion disposed longitudinally in the housing 28 and formed at the forward outer portion with a right angular handle forming arm 30. A collar 31, fastened on the bracket 29, limits the upward sliding movement of the bracket. To an angular lug on the inner end of the bracket 29 is secured one end of a coil spring 32, the opposed end of the spring being connected with a rod 33 slidably mounted in a switch casing 34 for actuating the control switch. Electric conductors 35 extend from the switch 34 to the motor 14 and control the circuit through the motor.

When it is desired to operate the signal, the vehicle operator pulls the handle 30 upwardly toward the steering wheel, simultaneously actuating the switch rod 33 to close the circuit through the motor 14 and drawing the control member 26 so as to swing the tone-arm 18 in such manner as to cause the stylus 22 to come into contact with the sound grooves on the periphery of the record 16 which is caused to revolve through the operation of the motor 14. When the handle 30 is released, the control switch 34 automatically opens to discontinue operation of the electric motor and release of the control member 26 allows the U spring 30 to tilt the tone-arm so that the stylus 22 disengages the record and the signal is rendered inoperative.

Thus, the signal may be equipped with a record for reproducing any desired sound, as for instance to annunciate the name of the manufacturer of the vehicle to which the device is attached, for example, "Henry Ford" or the like.

It is to be understood that the form of my invention herein shown and described is to be taken as a preferred example of the same, and that various changes as to the shape, size and arrangement of parts may be resorted to without departing from the spirit of the invention or the scope of the subjoined claim.

Having thus described my invention, I claim:—

In a sound signal of the character described, a tubular casing having a relatively large horn attached thereto at right angles to the casing longitudinal axis, a low-speed motor mounted in one end of the casing and having a shaft extending longitudinally therein, a disc secured to said shaft, the disc having on its peripheral edge a continuous sound record groove, a sound reproducing tone-arm having a small horn pivoted concentrically within the larger horn and having a stylus engageable with the record groove to reproduce the sounds inscribed therein, spring means yieldingly holding the tone-arm away from the sound groove, and remote control mechanism for simultaneously controlling the operation of the record operating motor and the tone arm for sounding the signal.

LEO FORTIER.